2,997,468
PREPARATION OF PHENOTHIAZINES

Joseph Schwartz, Plainfield, N.J., assignor to Olin Mathieson Chemical Corporation, New York, N.Y., a corporation of Virginia
No Drawing. Filed Nov. 6, 1958, Ser. No. 772,169
1 Claim. (Cl. 260—243)

This invention relates to, and has for its object the provision of, a new and improved process for the preparation of physiologically active phenothiazines and new intermediates utilizable in said process.

The physiologically-active compounds prepared by the process of this invention include: (A) bases of the general formula

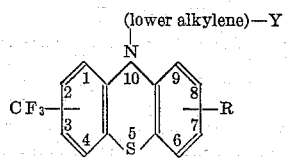

and (B) acid-addition salts thereof, wherein R is a member of the class consisting of hydrogen, lower alkyl, lower alkoxy and halo, and Y is a basic nitrogen-containing radical of less than twelve carbon atoms.

New intermediates utilizable in the process of this invention include compounds of the general formula

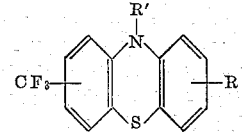

wherein R is as hereinbefore defined and R' is a member of the class consisting of

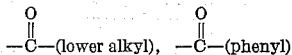

and 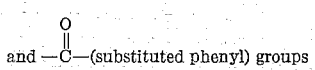

The terms "lower alkylene," "lower alkyl" and "lower alkoxy," as employed herein, include both straight and branched radicals of less than eight carbon atoms.

Among the suitable radicals represented by the symbol Y are: amino; (lower alkyl)amino; di(lower alkyl)amino; (hydroxy-lower alkyl)amino; di(hydroxy-lower alkyl)amino; and basic saturated 5 to 6 numbered monocyclic heterocyclic radicals of less than twelve carbon atoms, as exemplified by piperidyl [i.e., piperdino, 2-piperidyl, 3-piperidyl and 4-piperidyl]; (lower alkyl) piperidyl [e.g., 2, 3, or 4-(lower alkyl)piperidino or 2, 3, or 4-(N-lower alkyl)piperidyl]; di(lower alkyl)piperidyl [e.g., 2,4-, 2,6- or 3,5-di(lower alkyl) piperidino, or 2, 3, or 4-(lower alkyl-2, 3, or 4-lower alkyl)piperidyl]; (lower alkoxy)piperidyl; pyrrolidyl; (lower alkyl)pyrrolidyl; di(lower alkyl)pyrrolidyl; (lower alkoxy)pyrrolidyl; piperazyl; (lower alkyl)piperazyl [e.g., $N^4$-methyl-piperazino]; hydroxy lower alkyl)piperazyl [e.g., $N^4$-hydroxyethylpiperazino]; di(lower alkyl)piperazyl; (lower alkoxy)piperazyl; (lower carbaloxy)piperazyl; (hydroxy-alkoxyalkyl)piperazyl [e.g., $N^4$-hydroxyethoxyethylpiperazino]; acyloxyalkylpiperazino [e.g., $N^4$-acetoxyethyl-piperazino]; and other basic saturated monocyclic heterocyclic radicals of less than twelve carbons.

Preferably the lower alkylene group has a two or three carbon chain between the nitrogen in the position 10 and Y; R is hydrogen; the trifluoromethyl group is in the 2-position; and Y is a di(lower alkyl)amino or a piperazyl containing radical.

The salts (B) include the mono- and di-acid-addition salts, particularly non-toxic pharmacologically acceptable acid-addition salts. Acids useful in preparing the addition salts comprise inter alia: organic acids, such as oxalic, tartaric, citric, succinic, acetic, theophylline, 8-chlorotheophylline, fumaric, lactic and maleic; and inorganic acids, such as nitric, sulfuric phosphoric, boric and (especially) hydrohalic—for example, hydrobromic and hydrochloric.

In the process of this invention, a trifluoromethyl-2-amino-2',4'-dinitro-diphenylsulfide (I) (prepared as described in the Florey et al. application Serial No. 644,484, now abandoned, filed March 7, 1957) is treated with a compound selected from the group consisting of lower alkanoic anhydrides (e.g. acetic anhydride), lower alkanoyl halides and benzoyl or substituted benzoyl halides (e.g. chlorbenzoyl chloride) to give a trifluoromethyl-2-substituted amido-2',4'-dinitro-diphenylsulfide (II) which is in turn reacted with an alkali metal hydroxide (e.g. potassium hydroxide) to give a trifluoromethyl-7-nitro-10-acetyl-phenothiazine (III) which is reduced to yield the corresponding trifluoromethyl - 7 - amino - 10 - acyl-phenothiazine (IV) which is then deaminated to give a 10-acyl-trifluoromethylphenothiazine (V). The resulting substituted phenothiazine (V) is extracted with a water immiscible organic solvent (e.g. xylene benzene, toluene) and then reacted with a basic condensation agent (e.g. sodamide, and sodium hydride) and an amino alkyl halide (e.g. dimethylaminopropyl chloride) to yield the bases (VI) and the acid-addition salts thereof (VII), wherein X is an anion, which are the therapeutically active compounds prepared by the process of this invention.

The process of this invention may be represented schematically as follows:

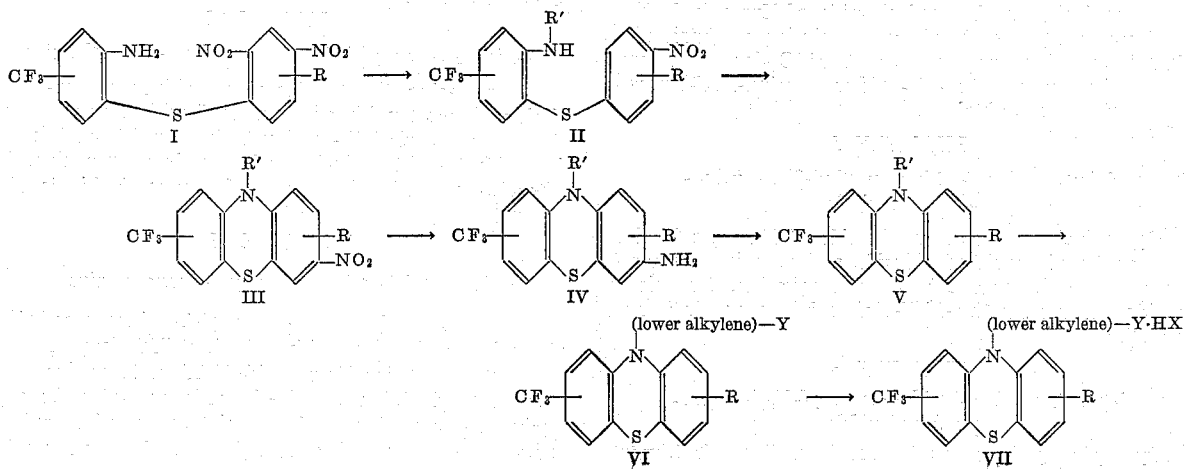

It, therefore, is an object of this invention to provide a less expensive process of preparing the physiologically active phenothiazines.

A further object of this invention is the preparation of new intermediates utilizable in preparing physiologically active phenothiazines.

The following examples are illustrative, but by no means limitative, of the invention:

EXAMPLE 1

*2-acetamido-4-trifluoromethyl-2',4'-dinitro-diphenylsulfide*

To 100 grams of 2-amino-4-trifluoromethyl-2',4'-dinitrodiphenylsulfide is added 100 ml. of acetic anhydride. With mild agitation, the temperature is brought to about 100° C. and kept at this point for about one hour. With strong agitation, 33 ml. of water (2 mole equiv.) is slowly added to the reaction mixture, while maintaining heat application. The temperature rises to about 115-120° C. The resulting acetic acid solution is then heated at reflux (105° C.) for one hour. With cooling, 200 ml. of water is added over a period of 10 minutes. The mixture is then kept at 20° C. for one hour, filtered, and the product washed with water until no acid remains. The brownish crystals which are in the form of samll pellets are dried in vacuo at 75° C. Melting point about 164–168° C.; yield about 98 grams (about 87.5%).

EXAMPLE 2

*2-benzamido-4-trifluoromethyl-2',4'-dinitro-diphenyl sulfide*

One hundred grams of 2-amino-4-trifluoromethyl-2',4'-dinitrodiphenyl sulfide is mixed with 136 grams of benzoylchloride. With mild agitation, the temperature is brought to 100° C. and kept at this point for one and one-half hours. After cooling to 30° C., 55 grams of pyridine is added slowly with agitation. The temperature rises sharply and is kept below 75° C. by external cooling, 250–300 mililiters of water is then added slowly, using the same precautions (external cooling) against overheating. The mixture is kept at 20° C. for one hour, filtered, and the product washed with water until no acid remains.

EXAMPLE 3

*2-p-chlorobenzoyl-4-trifluoromethyl-2',4'-dinitro-diphenylsulfide*

By replacing the benzoyl chloride of Example 2 with 171 grams of p-chlorobenzoyl chloride and maintaining the reaction temperature at 100° C. for two hours, 2-chlorobenzamido - 4 - trifluoromethyl - 2',4' - dinotrodiphenylsulfide is obtained.

EXAMPLE 4

*2-o-methoxybenzamido-4-trifluoromethyl-2',4'-dinitrodiphenylsulfide*

By replacing the benzoyl chloride of Example 2 with 167 grams of o-methoxy-benzoyl chloride and maintaining the reaction temperature at 100° C. for two hours, 2-o-methoxybenzamido - 4 - trifluoromethyl-2',4'-dinitro-diphenylsulfide is obtained.

EXAMPLE 5

*2-butyramido-4-trifluoromethyl-2',4'-dinitro-diphenylsulfide*

By replacing the benzoyl chloride of Example 2 with 152 grams of propionyl chloride and refluxing the mixture at 80° C. for one hour with agitation, 2-propionamido-4-trifluoromethyl-2',4'-dinitrodiphenylsulfide is obtained.

EXAMPLE 6

*2-propionamido-4-trifluoromethyl-2',4'-dinitro-diphenylsulfide*

By replacing the benzoyl chloride of Example 2 with 166 grams of n-butyryl chloride and refluxing the mixture at 102° C. for one hour with agitation, 2-butyramido-4-trifluoromethyl-2',4'-dinitrodiphenylsulfide is obtained.

EXAMPLE 7

*7-nitro-10-acetyl-2-(trifluoromethyl)-phenothiazine*

Ninety-eight grams of 2-acetamido-4-trifluoromethyl-2',4'-dinitrodiphenylsulfide is dissolved in 500 ml. of acetone and filtered. 12.2 g. of potassium hydroxide is added as a 4 N 95% alcoholic solution to the acetone solution. The mixture is then heated to reflux for a 45-minute period. One liter of water is added and the solution is cooled to 10° C. After one hour, the brown crystals of 7-nitro-10-acetyl - 2 - trifluoromethyl phenothiazine are filtered and washed with water. Melting point about 165–170° C.; yield about 70.5 grams (about 91%).

EXAMPLE 8

*7-nitro-10-benzoyl-2-(trifluoromethyl)phenothiazine*

By replacing the 2-acetamido-4-trifluoromethyl-2',4'-dinitrodiphenylsulfide of Example 7 with 2-benzamido-4-trifluoromethyl-2',4'-dinitro-diphenylsulfide and reacting with 1-mole equivalent of potassium hydroxide 7-nitro-10-benzoyl-2-(trifluoromethyl)-phenothiazine is obtained.

EXAMPLE 9

*7-nitro-10-p-chlorobenzoyl-2-(trifluoromethyl)-phenothiazine*

By replacing the 2-acetamido-4-trifluoromethyl-2',4'-dinitro-diphenylsulfide of Example 7 with 2-p-chlorobenzamido - 4 - trifluoromethyl - 2',4' - dinitro-diphenylsulfide and reacting with 1-mole equivalent of potassium hydroxide, 7 - nitro - 10 - p-chlorobenzoyl-2-(trifluoromethyl)-phenothiazine is obtained.

EXAMPLE 10

*7-nitro-10-o-methoxybenzoyl-2-(trifluoromethyl)-phenothiazine*

By replacing the 2-acetamido-4-trifluoromethyl-2',4'-dinitro-diphenylsulfide of Example 7 with 2-o-methoxybenzamido - 4 - trifluoromethyl - 2',4' - dinitro-diphenyl sulfide and reacting with 1-mole equivalent of potassium hydroxide, 7-nitro - 10 - o - methoxybenzoyl-2-(trifluoromethyl)-phenothiazine is obtained.

EXAMPLE 11

*7-nitro-10-propionyl-2-(trifluoromethyl)-phenothiazine*

By replacing the 2-acetamido-4-trifluoromethyl-2',4'-dinitro-diphenylsulfide of Example 7 with 2-propionamido-4-trifluoromethyl-2',4' - dinitro-diphenylsulfide and reacting with 1-mole equivalent of potassium hydroxide, 7-nitro - 10 - propionyl - 2 - (trifluoromethyl)-phenothiazine is obtained.

EXAMPLE 12

*7-nitro-10-butyryl-2-(trifluoromethyl)-phenothiazine*

By replacing the 2-acetamido-4-trifluoromethyl-2',4'-dinitro-diphenylsulfide of Example 7 with 2-butylamido-4-trifluoromethyl-2',4' - dinitro-diphenylsulfide and reacting with 1-mole equivalent of potassium hydroxide, 7-nitro-10-butyryl-2-(trifluoromethyl)-phenothiazine is obtained.

EXAMPLE 13

*10-acetyl-2-(trifluoromethyl)-phenothiazine*

70.5 grams of 7-nitro-10-acetyl-2-(trifluoromethyl)-phenothiazine is mixed with 705 ml. of 75% isopropanol. Concentrated hydrochloric acid (0.25 mole equivalent) (4.1 ml.) and 66.6 grams of reduced iron powder (2 mole equivalent) are added and the mixture heated to reflux for one-half hour with good agitation. The mixture is cooled to 20° C. and the iron is removed by filtration. The filter cake is washed with 100 ml. isopropanol.

[To isolate the 7-amino-10-acetyl-2-(trifluoromethyl)-phenothiazine, the pH is raised to 11 to precipitate iron salts which are separated by filtration. The pH is then lowered to 3 using hydrochloric acid. The solvent which is 75% isopropanol-25% water is distilled to remove the water. Greenish yellow crystals of 7-amino-10-acetyl-2-(trifluoromethyl)-phenothiazine form as the solution becomes concentrated; M.P. about 200° C.–205° C.]

The combined filtrates from the reduction are diluted with 247 ml. 2 N HCl and the solution cooled to 0–5° C. One equivalent of 97% sodium nitrite (12.8 grams) is dissolved in 50 ml. water and introduced below the level of the main solution, while maintaining the temperature below 10° C. Agitation is continued for one-half hour at this low temperature. The pH is brought to 7 using 4 N aqueous NaOH. During this neutralization, the hydroxydiazonium compound, along with impurities, precipitates out of the solution. The mixture is then gently refluxed for one hour. The isopropanol is removed by vacuum distillation and the 10-acetyl-2-trifluoromethyl-phenothiazine is extracted into 90 ml. xylene which is kept at 10–15° C. for several hours and impurities removed by filtration. The solution is dried over magnesium sulfate. The compound is isolated by high vacuum distillation, dissolving the clear distillate in a minimum amount of alcohol and evaporating the solvent (without benefit of heat or vacuum). Abrasive agitation of the concentrated solution produces off-white crystals of 10-acetyl-2-(trifluoromethyl)-phenothiazine, M.P. about 40° C.

EXAMPLE 14

*10-benzoyl-2-(trifluoromethyl)-phenothiazine*

By replacing the 7-nitro-10-acetyl-2-(trifluoromethyl)-phenothiazine of Example 13 with 7-nitro-10-benzoyl-2-(trifluoromethyl)-phenothiazine 10-benzoyl-2-(trifluoromethyl)-phenothiazine is obtained.

EXAMPLE 15

*10-p-chlorobenzoyl-2-(trifluoromethyl)-phenothiazine*

By replacing the 7-nitro-10-acetyl-2-(trifluoromethyl)-phenothiazine of Example 13 with 7-nitro-10-p-chlorobenzoyl-2-(trifluoromethyl)-phenothiazine, 10-p-chlorobenzoyl-2-(trifluoromethyl)-phenothiazine is obtained.

EXAMPLE 16

*10-o-methoxybenzoyl-2-(trifluoromethyl)-phenothiazine*

By replacing the 7-nitro-10-acetyl-2-(trifluoromethyl)-phenothiazine of Example 13 with 7-nitro-10-o-methoxybenzoyl-2-(trifluoromethyl)-phenothiazine, 10-o-methoxybenzoyl-2-(trifluoromethyl)-phenothiazine is obtained.

EXAMPLE 17

*10-propionyl-2-(trifluoromethyl)-phenothiazine*

By replacing the 7-nitro-10-acetyl-2-(trifluoromethyl)-phenothiazine of Example 13 with 7-nitro-10-propionyl-2-(trifluoromethyl)-phenothiazine, 10-propionyl-2-(trifluoromethyl)-phenothiazine is obtained.

EXAMPLE 18

*10-butyryl-2-(trifluoromethyl)-phenothiazine*

By replacing the 7-nitro-10-acetyl-2-(trifluoromethyl)-phenothiazine of Example 13 with 7-nitro-10-butyryl-2-(trifluoromethyl)-phenothiazine, 10-butyryl-2-(trifluoromethyl)-phenothiazine is obtained.

EXAMPLE 19

*10-(3-dimethylaminopropyl)-2-(trifluoromethyl)-phenothiazine*

To 90 ml. of a xylene solution containing 38 grams 10-acetyl-2-(trifluoromethyl)-phenothiazine is added 75 ml. of anhydrous xylene, 10 grams of sodamide (2.1 mole equivalent) and 18 grams of 3-(dimethylamino)propyl chloride in a 3.5 N xylene solution (1.2 mole equivalent). With good agitation, the mixture is slowly brought to reflux and kept at this point for one and one-half to two hours. After cooling, the mixture is filtered and the insolubles washed with 20 ml. xylene. The solvent is stripped off and the base distilled under high vacuum. The boiling point is about 172° C. at 350–400μ; refractive index 1.5770 at 25° C. Yield is about 37.3 grams.

By replacing the 10-acetyl-2-(trifluoromethyl)-phenothiazine of Example 19 with any of the compounds of Examples 14 through 18, 10-(3-dimethylaminopropyl)-2-(trifluoromethyl)-phenothiazine is obtained.

Furthermore, by replacing the 3-(dimethylamino)-propyl chloride reactant in Example 19 with any other aminoalkyl halide, preferably an amino alkyl chloride of the formula: Y-(lower alkyl)Cl, wherein Y is as hereinbefore defined, the corresponding 10-[Y-(lower alkyl)]-2-trifluoromethyl phenothiazine is formed.

The invention may be variously other wise embodied within the scope of the appended claims.

What is claimed is:

The process which essentially consists of reacting under reflux conditions and in anhydrous medium a compound of the general formula

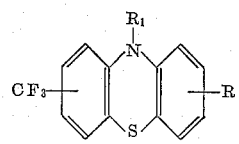

wherein R is selected from the class consisting of hydrogen, lower alkyl, lower alkoxy and halo and R' is selected from the class consisting of $$-\overset{O}{\underset{\|}{C}}-\text{(lower alkyl)}, -\overset{O}{\underset{\|}{C}}-\text{(phenyl) and} -\overset{O}{\underset{\|}{C}}-\text{(chlorophenyl) groups}$$

with a basic condensation agent, and an amino alkyl halide in a water immiscible organic solvent.

References Cited in the file of this patent

UNITED STATES PATENTS

| | | |
|---|---|---|
| 2,587,660 | Smith | Mar. 4, 1952 |
| 2,645,640 | Charpentier | July 14, 1953 |

FOREIGN PATENTS

| | | |
|---|---|---|
| 91,198 | Norway | June 23, 1958 |

OTHER REFERENCES

Bergmann: The Chemistry of Acetylene and Related compounds, page 80, Interscience Publishers Inc., N.Y. (1948).

Groggins: Unit Processes in Org. Synthesis, 4th ed., McGraw-Hill Co. (1952), pp. 86, 135, 138.

Cauquil et al.: Comptes Rendus, vol. 236, pp. 1569–1571 (1953).

Massie: Chem. Reviews, vol. 54, pp. 803–5, 822 (1954).

Roe et al.: J. Org. Chem., vol. 20, pp. 1577–1590 (1955).

Yale: J. Am. Chem. Soc., vol. 77, pp. 2270–2272 (1955).

Craig: J. Org. Chem., vol. 22, pp. 709–711 (June 1957).

Talukdar et al.: J. Am. Chem. Soc., vol. 80, pp. 3462–6 (July 5, 1958).